(12) United States Patent
Uchimura et al.

(10) Patent No.: US 11,585,924 B2
(45) Date of Patent: Feb. 21, 2023

(54) SPATIAL RECOGNITION DEVICE, SPATIAL RECOGNITION METHOD, AND PROGRAM

(71) Applicant: NEC CORPORATION, Tokyo (JP)

(72) Inventors: Jun Uchimura, Tokyo (JP); Hiroshi Takahashi, Kanagawa (JP); Masato Watanabe, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 443 days.

(21) Appl. No.: 16/643,971

(22) PCT Filed: Aug. 16, 2018

(86) PCT No.: PCT/JP2018/030413
§ 371 (c)(1),
(2) Date: Mar. 3, 2020

(87) PCT Pub. No.: WO2019/049627
PCT Pub. Date: Mar. 14, 2019

(65) Prior Publication Data
US 2021/0063572 A1    Mar. 4, 2021

(30) Foreign Application Priority Data

Sep. 5, 2017    (JP) .............................. JP2017-170376

(51) Int. Cl.
*G01S 17/08*    (2006.01)
*G01S 17/48*    (2006.01)
(Continued)

(52) U.S. Cl.
CPC .............. *G01S 17/08* (2013.01); *G01S 17/06* (2013.01); *G01S 17/48* (2013.01); *G01S 17/74* (2013.01)

(58) Field of Classification Search
CPC .......... G01S 17/08; G01S 17/06; G01S 17/48; G01S 17/74; G01B 11/00
See application file for complete search history.

(56) References Cited

U.S. PATENT DOCUMENTS 5,215,423 A * 6/1993 Schulte-Hinsken ....................... G01S 17/875
414/408

FOREIGN PATENT DOCUMENTS

JP    S61-117409 A    6/1986
JP    07-152434 A    6/1995
(Continued)

OTHER PUBLICATIONS

International Search Report for PCT/JP2018/030413 dated Sep. 18, 2018 [PCT/ISA/210].
(Continued)

*Primary Examiner* — Marthe Y Marc-Coleman
(74) *Attorney, Agent, or Firm* — Sughrue Mion, PLLC (57) ABSTRACT

A spatial recognition device provided with an analysis unit configure to acquire, from an optical device, which is mounted on a moving body and which receives reflected light obtained by radiating light onto a reflective plate provided on a stationary structure positioned within a detection area, reflected light information obtained based on the reflected light in accordance with a radiation direction of the light, and determine a positional relationship between the moving body and the stationary structure on which the reflective plate is provided, based on a distribution of the reflected light information at coordinates within the detection area.

8 Claims, 7 Drawing Sheets

(51) Int. Cl.
    *G01S 17/06*           (2006.01)
    *G01S 17/74*           (2006.01)

(56)           References Cited

FOREIGN PATENT DOCUMENTS

| JP | 11-166831 A | | 6/1999 |
|---|---|---|---|
| JP | 2002-188918 A | | 7/2002 |
| JP | 2005-274232 A | | 10/2005 |
| JP | 2007-257226 A | | 10/2007 |
| JP | 2017-039188 A | | 2/2017 |
| JP | 2017039188 A | * | 2/2017 |

OTHER PUBLICATIONS

Japanese Office Action for JP Application No. 2017-170376 dated Oct. 26, 2021 with English Translation.
Japanese Office Communication for JP Application No. 2017-170376 dated May 24, 2022 with English Translation.

* cited by examiner

SPATIAL RECOGNITION DEVICE, SPATIAL RECOGNITION METHOD, AND PROGRAM

CROSS REFERENCE TO RELATED APPLICATIONS

This application is a National Stage of International Application No. PCT/JP2018/030413 filed Aug. 16, 2018, claiming priority based on Japanese Patent Application No. 2017-170376 filed Sep. 5, 2017.

TECHNICAL FIELD

The present invention relates to a spatial recognition device, a spatial recognition method, and a program.

BACKGROUND ART

Technologies for radiating light and analyzing the reflected light in order to recognize the positions of moving bodies that move within a certain space are disclosed in Patent Document 1 and Patent Document 2.

CITATION LIST

Patent Literature

[Patent Document 1]
Japanese Unexamined Patent Application, First Publication No. 7-152434
[Patent Document 2]
Japanese Unexamined Patent Application, First Publication No. 2002-188918

SUMMARY OF INVENTION

Problem to be Solved by the Invention

When placing various objects within a space in which many stationary structures are arranged in the same pattern, there is a need for a technology that can easily, at low cost, recognize the position of a moving body or freight placed near that position.

Thus, an objective of the present invention is to provide a spatial recognition device, a spatial recognition method, and a program that can solve the above-mentioned problem.

Means for Solving the Problem

According to a first embodiment of the present invention, a spatial recognition device includes an analysis unit configured to acquire, from an optical device, which is mounted on a moving body and which receives reflected light obtained by radiating light onto a reflective plate provided on a stationary structure positioned within a detection area, reflected light information obtained based on the reflected light in accordance with a radiation direction of the light, and determine a positional relationship between the moving body and the stationary structure on which the reflective plate is provided, based on a distribution of the reflected light information at coordinates within the detection area.

According to a second embodiment of the present invention, a spatial recognition method by a spatial recognition device, the spatial recognition method includes: acquiring, from an optical device, which is mounted on a moving body and which receives reflected light obtained by radiating light onto a reflective plate provided on a stationary structure positioned within a detection area, reflected light information obtained based on the reflected light in accordance with a radiation direction of the light; and determining a positional relationship between the moving body and the stationary structure on which the reflective plate is provided, based on a distribution of the reflected light information at coordinates within the detection area.

According to a third embodiment of the present invention, a program that causes a computer in a spatial recognition device to execute processes, the processes including: acquiring, from an optical device, which is mounted on a moving body and which receives reflected light obtained by radiating light onto a reflective plate provided on a stationary structure positioned within a detection area, reflected light information obtained based on the reflected light in accordance with a radiation direction of the light; and determining a positional relationship between the moving body and the stationary structure on which the reflective plate is provided, based on a distribution of the reflected light information at coordinates within the detection area.

Advantageous Effects of Invention

According to the present invention, in a space in which many stationary structures are arranged in the same pattern and various objects are placed, the spatial recognition device can easily recognize the current position of a moving body or an object placed near that position.

DESCRIPTION OF EMBODIMENTS

Hereinafter, a spatial recognition device according to an embodiment of the present invention will be explained with reference to the drawings.

Figure 1:
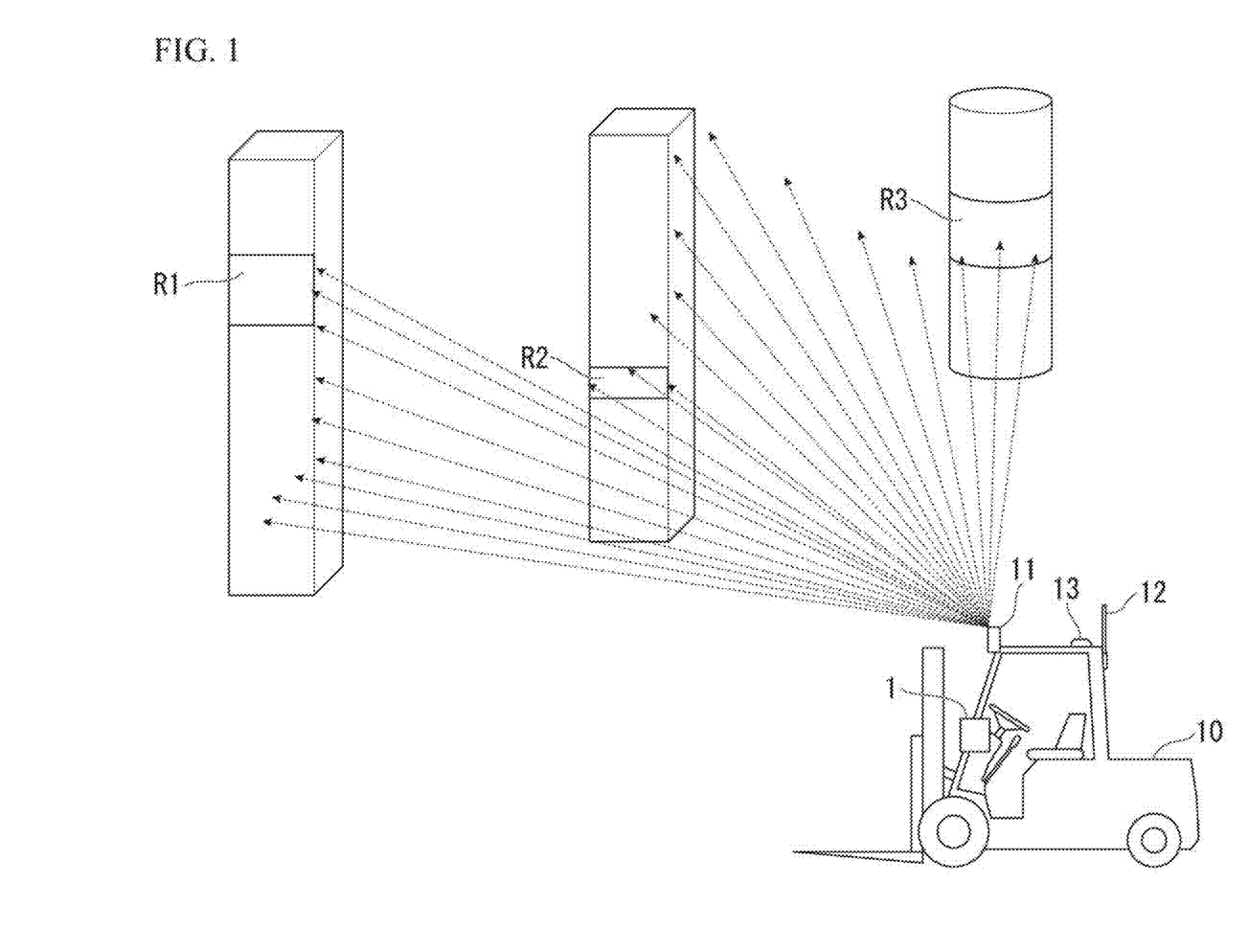
FIG. 1 is a diagram schematically illustrating a spatial recognition system according to an embodiment of the present invention.

FIG. 1 is a diagram schematically illustrating a spatial recognition system including a forklift provided with a spatial recognition device according to an embodiment of the present invention.

The forklift 10 illustrated in FIG. 1 is an example of a moving body that moves within a space in which various types of freight are placed and many stationary structures are arranged in the same pattern. The forklift 10 carries freight, such as containers, that are placed in the space, through which the forklift 10 can move. An example of a forklift 10 is one provided with a spatial recognition device 1, a radar device 11, a terrestrial communication antenna 12, a satellite antenna 13, and the like.

The stationary structures arranged in the space are, for example, columns, walls and the like. FIG. 1 shows reflective plates R1, R2 and R3 mounted on square or circular columns. The reflective plates R1, R2 and R3 will be referred to collectively as reflective plates R. The radar device 11, which is an optical device mounted on the forklift 10, radiates light within a detection area in the space based on control by the spatial recognition device 1, and when that light is reflected back, receives the reflected light. The radar device 11, for example, is provided with a sensor, and outputs the intensity (received light intensity) of the reflected light received by a light-receiving element in the sensor. The received light intensity of the reflected light reflected by the reflective plates R and received by the radar device 11 is stronger than the received light intensity of reflected light reflected at positions other than the reflective plates R and received by the radar device 11. The radar device 11 outputs, to the spatial recognition device 1, information such as the received light intensity obtained from the reflected light. The radar device 11 also outputs, to the spatial recognition device 1, information regarding the range to each reflection position, computed on the basis of the reflected light.

The radar device 11 radiates light onto respective reflection positions corresponding to the respective pixels in a finely divided image surface of the detection area. The radar device 11 outputs, to the spatial recognition device 1, information regarding received light intensities and ranges obtained from the reflected light obtained when the radiated light is reflected at the reflection positions. The spatial recognition device 1 acquires, from the radar device 11, the information regarding the received light intensities, ranges and the like obtained from the reflected light in accordance with the reflection positions of the light. The spatial recognition device 1 determines at least the positions of the moving body and stationary structures on which reflective plates R are provided, on the basis of distributions of the acquired information. The spatial recognition device 1 may analyze identification information regarding stationary structures on which the reflective plates R are provided, based on the distribution of the reflected light information in the areas estimated to be the reflective plates R. Additionally, the spatial recognition device 1 may analyze the identification information regarding stationary structures on which the reflective plates R are provided by analyzing the distribution of recesses and protrusions provided on the reflective plates R. The spatial recognition device 1 may analyze the position of the moving body on the basis of the positions of the stationary structures.

Figure 2:
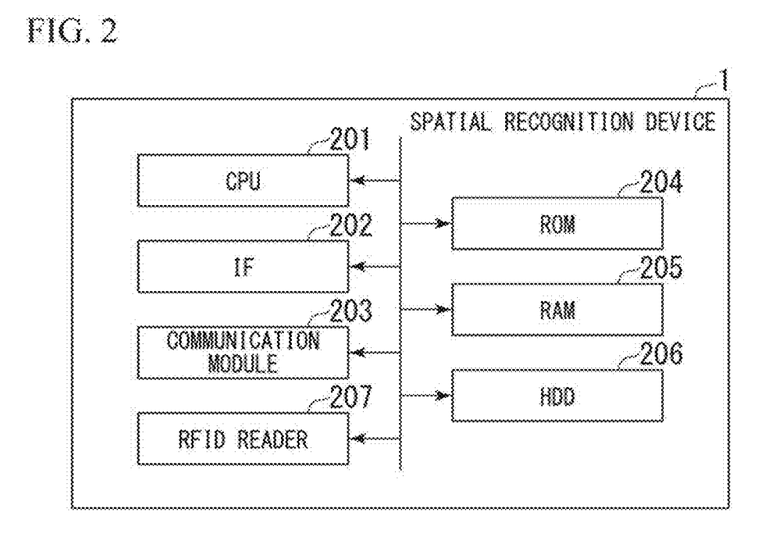
FIG. 2 is a diagram illustrating the hardware structure of a spatial recognition device according to an embodiment of the present invention.

FIG. 2 is a diagram illustrating the hardware structure of the spatial recognition device 1 according to the same embodiment.

The spatial recognition device 1 is provided with features such as a CPU (Central Processing Unit) 201, an IF (Interface) 202, a communication module 203, a ROM (Read-Only Memory) 204, a RAM (Random Access Memory) 206, an HDD (Hard Disk Drive) 206, an RFID reader 207, and the like. The communication module 203 transmits and receives signals by means of the terrestrial communication antenna 12 or the satellite antenna 13. The IF 202 is connected to a touch panel display or the like provided, for example, on the spatial recognition device 1. The RFID reader 207, for example, reads RFID tags provided on placed containers or the like, and acquires information such as freight IDs.

Figure 3:
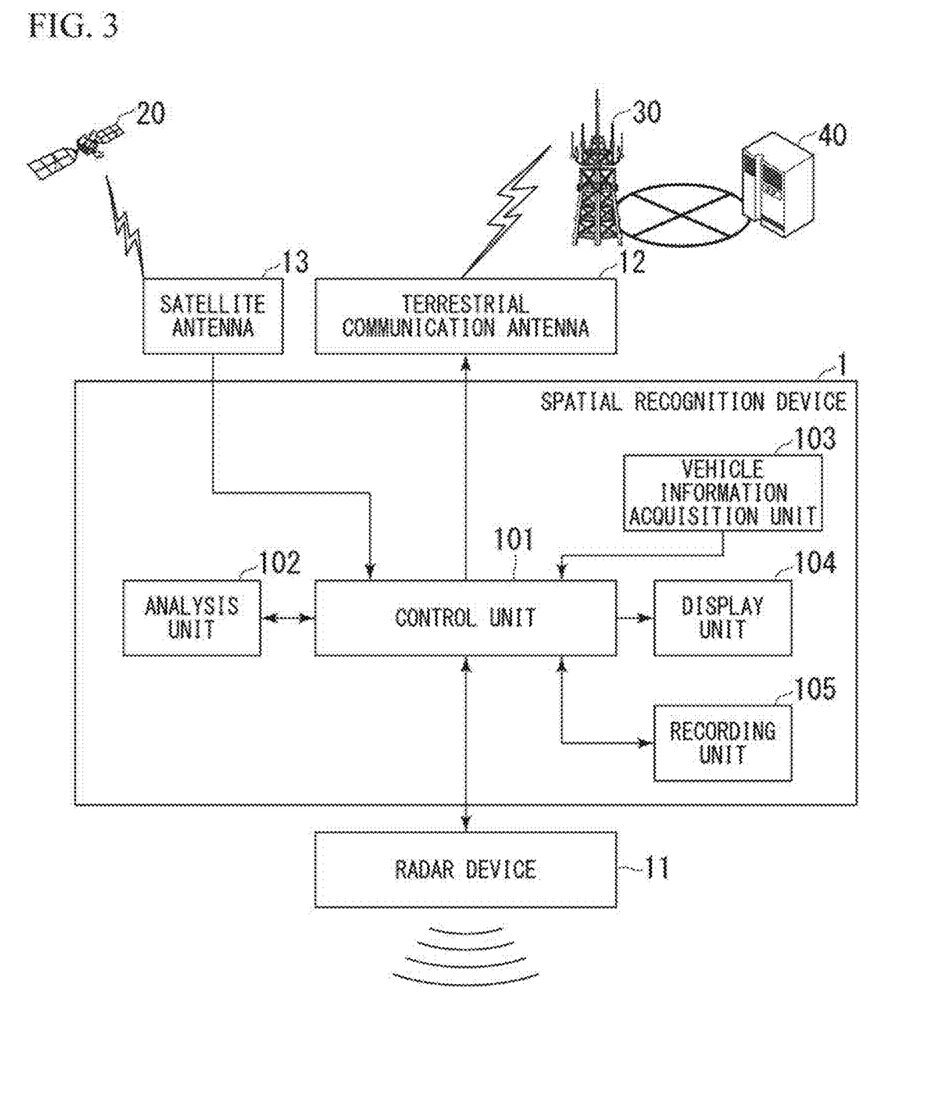
FIG. 3 is a diagram illustrating functional blocks in a spatial recognition device according to an embodiment of the present invention.

FIG. 3 is a diagram illustrating functional blocks in the spatial recognition device 1 according to the same embodiment.

The spatial recognition device 1 is provided with functional units including a control unit 101, an analysis unit 102, a vehicle information acquisition unit 103, a display unit 104 and a recording unit 105.

The control unit 101 controls the functions provided in the spatial recognition device 1. The control unit 101 acquires signals that the satellite antenna 13 has received from a satellite 20. Additionally, the control unit 101 outputs signals to the terrestrial communication antenna 12. The terrestrial communication antenna 12, for example, outputs the signals received from the control unit 101 to a server device 40 or the like through means of a wireless base station 30.

The radar device 2 radiates light onto the reflective plates R provided on stationary structures positioned within the detection area and receives the reflected light. The analysis unit 102 acquires, from the radar device 11, information obtained based on the reflected light in accordance with the radiation direction of the light. The analysis unit 102 determines at least the positional relationship between the moving body and the stationary structures on which the reflective plates R are provided, on the basis of distributions of information obtained based on the reflected light at each coordinate within the detection area of the radar device 11. The information distribution is, for example, a distribution of values indicating received light intensities and ranges obtained from the reflected light.

The vehicle information acquisition unit 103 acquires the ID (identification) or the like of the forklift 10 on which the spatial recognition device 1 is provided.

The display unit 104 outputs display information, such as warning information or position information, on a monitor or the like provided on the spatial recognition device 1.

The recording unit 105 records information such as the analysis results from the analysis unit 102 in a storage device such as the ROM 204 or the RAM 205.

Figure 4:
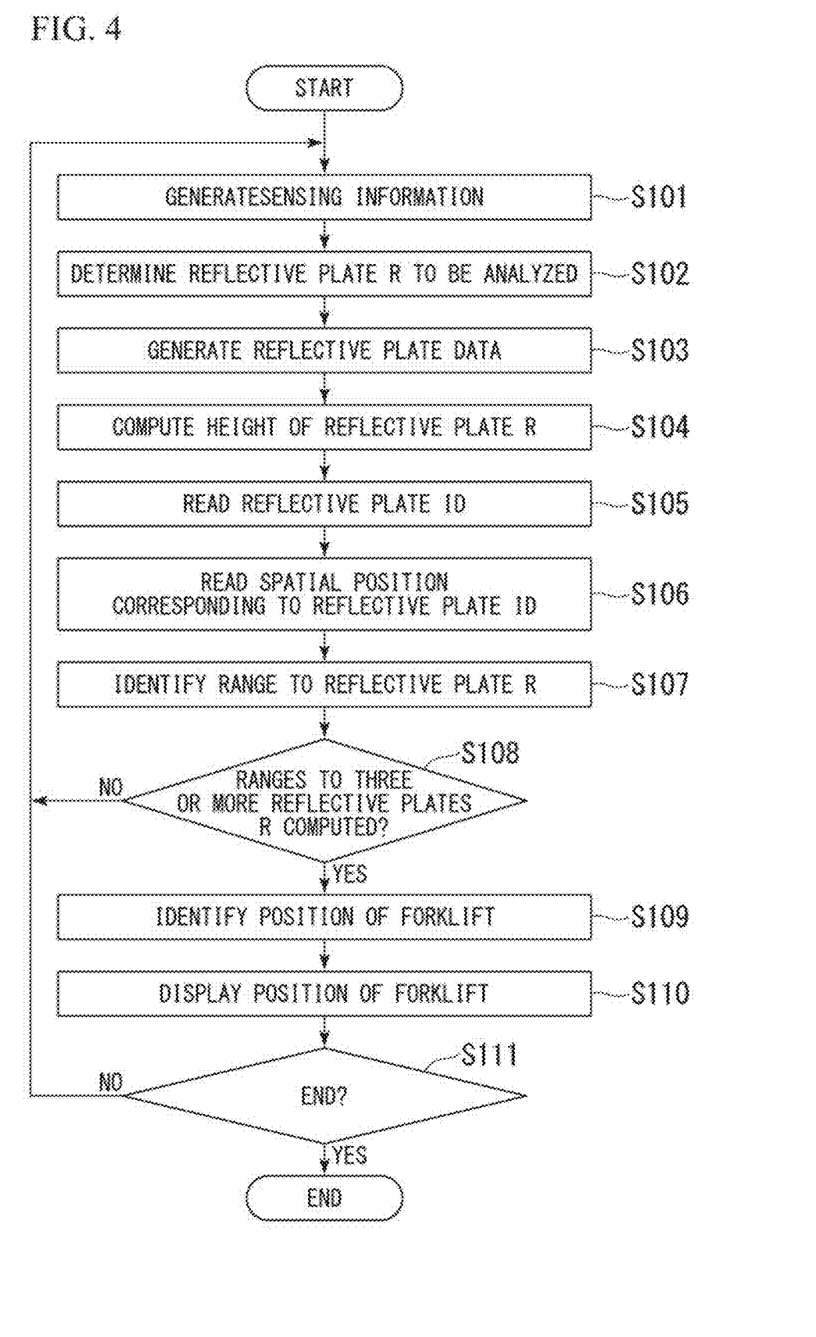
FIG. 4 is a diagram illustrating the processing flow in a spatial recognition device according to an embodiment of the present invention.

FIG. 4 is a diagram illustrating the processing flow in the spatial recognition device 1.

Next, the processing flow in the spatial recognition device 1 will be explained by following the sequence.

The user operating the forklift 10 controls the spatial recognition device 1, and as one example, detects the current position of the forklift 10 and the type of object, such as a container, placed nearby. The user provides a processing start instruction to the spatial recognition device 1. Then, the control unit 101 of the spatial recognition device 1 instructs the radar device 11 to start processing. The radar device 11 radiates light in each direction in the detection area of that device, and receives reflected light from reflection positions. The radar device 11, as one example, may detect the intensity of the reflected light reflected by the objects included within the detection area for each direction in which the light is radiated. The radar device 11 outputs, to the spatial recognition device 1, the intensity of the reflected light due to the light radiated in each direction in the detection area, for each prescribed interval of one second, several milliseconds, or the like. The forklift 10 moves, thereby varying the detection area of the radar device 11.

The control unit 101 generates sensing information (step S101), including the received light intensities of the reflected light and the ranges to the reflection positions of the reflected light, corresponding to each light radiation direction within the detection area, received from the radar device 11, in each prescribed interval. The ranges to the reflection positions of the reflected light indicate the ranges from the radar device 11 to the reflection positions. The control unit 101 outputs the generated sensing information to the analysis unit 102. The sensing information includes at least information representing each pixel in a finely divided image surface of the detection area, the reflected light intensity of the reflected light from reflection positions corresponding to those pixels, and the ranges to the reflection positions corresponding to the respective pixels.

Figure 5:
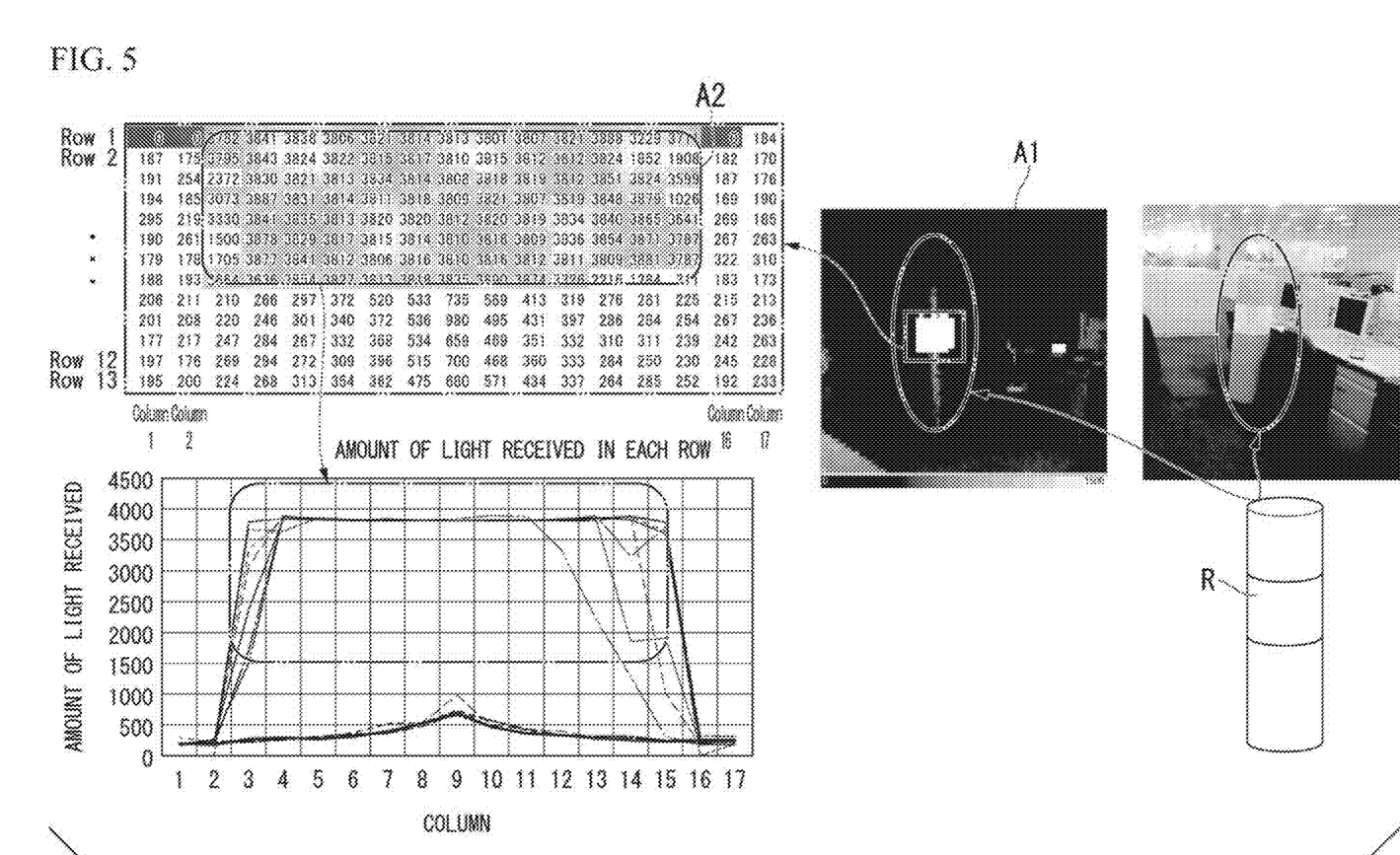
FIG. 5 is a diagram illustrating a specific example of sensing information according to an embodiment of the present invention.

FIG. 5 is a diagram illustrating a specific example of sensing information.

Upon receiving sensing information from the detection area, the analysis unit 102 extracts, from the sensing information, a data group associated with a high-intensity area A2 in which the reflected light intensity (received light intensity), such as the amount of light received, is a prescribed value or higher. The data group associated with the high-intensity area A2, as one example, includes reflected light intensities corresponding to the high-intensity area A2, within the detection area A1, in which the intensity of the reflected light (amount of light received) is high, as shown in FIG. 5. The data group associated with the high-intensity area A2 shown in FIG. 5 indicates, as one example, the reflected light intensity corresponding to the light radiation direction of each pixel in the high-intensity area A2, among the pixels obtained by dividing the detection area A1 into 13 rows arranged vertically and 17 columns arranged horizontally. The analysis unit 102 sequentially, in the row direction, for the pixels in each row in the data group in the detection area A1, determines whether or not the reflected light intensity is a threshold value or higher, and identifies pixels in which the reflected light intensity is the threshold value or higher. The analysis unit 102 performs the process for identifying pixels in which the reflected light intensity is the threshold value or higher for each row in the detection area A1. The analysis unit 102 determines the area of a pixel group in which the reflected light intensity is the threshold value or higher (high-intensity area A2) as being the area of a reflective plate R that is to be analyzed (step S102). In the example in FIG. 5, the threshold value of the reflected light intensity is, for example, the value "3000".

When the number of pixels, in the row direction and the column direction, in the high-intensity area A2 estimated to correspond to a reflective plate R detected by the analysis unit 102 is less than a prescribed number of pixels, the following determination can be made. Specifically, the analysis unit 102 can determine that the forklift 10 on which the radar device 11 is provided is located at a position far from the reflective plate R such that the area of the reflective plate R detected by the analysis unit 102 is perceived almost as a point. Additionally, when the number of pixels, in the row direction and the column direction, in the high-intensity area A2 estimated to correspond to a reflective plate R detected by the analysis unit 102 is at least a number of pixels covering the entire detection area A1, the following determination can be made. Specifically, the analysis unit 102 can determine that the forklift 10 is located at a position very close to the reflective plate R. As one example, when the forklift 10 is located at a position far from the reflective plate R such that the reflective plate is perceived as a point, the analysis unit 102 may exclude that reflective plate R from the analysis targets. The analysis unit 102 generates the pixel numbers of pixels within the high-intensity area A2 determined as corresponding to the area of a reflective plate R to be analyzed, and reflective plate data including the reflected light intensity at each pixel (step S103).

When the reflective plate data has been generated on the basis of the sensing information, the analysis unit 102 computes the height of a central portion in the area of the reflective plate R indicated by the reflective plate data (step S104). For example, the analysis unit 102 computes the height H2 of the central portion of the reflective plate R based on the height H1 at which the radar device 11 is mounted, the angle θ of the light radiation direction when the reflected light from the central portion of the reflective plate R was received, and the range X to the central portion of the reflective plate R. The range X to the central portion of the reflective plate R is computed based on the time elapsed from the light radiation time to the light reception time. The analysis unit 102 can compute the height H2 of the central portion of the reflective plate R by using the equation, "$H2=H1+X \sin \theta$".

Reflective plates R are provided, for example, at positions at different heights H2 on each of the columns and walls, which are stationary structures. The analysis unit 102 controls the light radiation direction of the radar device 11 and reads, from a storage unit such as the HDD 206, reflective plate IDs corresponding to the heights H2 of the reflective plates detected in the detection areas in each direction (step S105). The reflective plates R provided on each of the columns and walls, which are the stationary structures, may have different shapes. In this case, the analysis unit 102 analyzes the shapes of the reflective plates R by means of pattern recognition or the like, and reads the reflective plate IDs corresponding to those shapes from the storage unit. In other words, the analysis unit 102 determines the shapes of the reflective plates R based on the areas of the reflective plates R and acquires reflective plate IDs corresponding to the shapes.

In the HDD 206, positions (coordinates), within the space, corresponding to the reflective plate IDs are recorded. The analysis unit 102 reads spatial positions corresponding to the reflective plate IDs (step S106). Thus, reflective plates R are provided at positions at different heights H2 on each of a plurality of stationary structures. As a result thereof, the stationary structures on which the reflective plates R are provided can be identified on the basis of the heights H2, and the positions of those stationary structures can be detected. When a plurality of reflective plates R to be analyzed can be detected from the sensing information, the analysis unit 102 detects the reflective plate ID and position corresponding to each of the reflective plates R. Additionally, based on the sensing information, the analysis unit 102 identifies the ranges to the reflection positions indicating the pixels in the central portions of the areas of the reflective plates R being analyzed (step S107). The analysis unit 102, for example, computes the ranges from the radar device 11 to the reflection positions indicating the pixels in the central portions of the reflective plates R based on the time elapsed from the light radiation times to the light reception times. The analysis unit 102 determines whether or not ranges to reflective plates R have been computed for three or more reflective plates R (step S108). If ranges to reflective plates R have not been computed for three or more reflective plates R (NO in step S108), then the analysis unit 102 returns to the processing in step S101. In this case, the analysis unit 102 repeats the process from the generation of the next sensing information based on signals received from the radar device 11. On the other hand, if ranges to reflective plates R have been computed for three or more reflective plates R (YES in step S108), then the analysis unit 102 computes the coordinates at which the forklift 10 is located.

Figure 6:
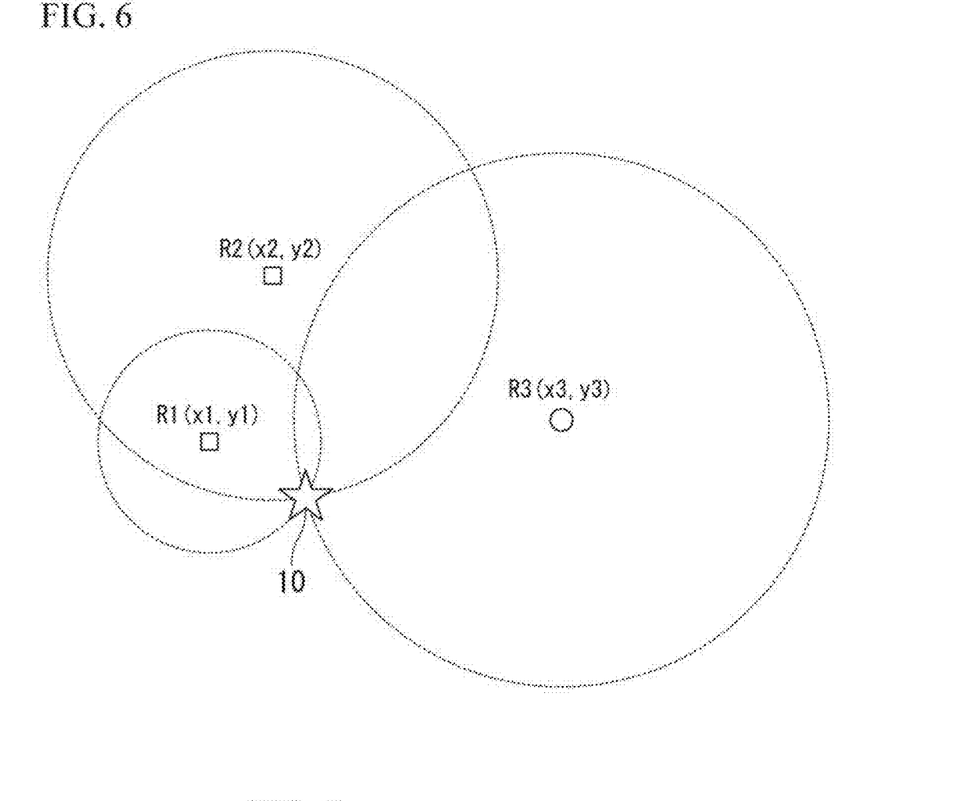
FIG. 6 is a diagram schematically illustrating the computation of coordinates at which a forklift is located according to an embodiment of the present invention.

FIG. 6 is a diagram schematically illustrating the computation of the coordinates at which the forklift 10 is located.

Upon acquiring the plurality of reflective plate IDs, the absolute positions of those reflective plates R, and the ranges to the central portions of the reflective plates R, the analysis unit 102 computes its own position based on that information. For example, the analysis unit 102 computes the intersection of three circles drawn based on the absolute position of each of the three reflective plates R1 to R3, and the ranges from the central portions of the reflective plates R1 to R3 to the radar device 11. The first circle is a circle centered at the coordinates (x1, y1) of the reflective plate R1 and having a radius equal to the range L1 from the central portion of that reflective plate R1 to the radar device 11. The second circle is a circle centered at the coordinates (x2, y2) of the reflective plate R2 and having a radius equal to the range L2 from the central portion of that reflective plate R2 to the radar device 11. The third circle is a circle centered at the coordinates (x3, y3) of the reflective plate R3 and having a radius equal to the range L3 from the central portion of that reflective plate R3 to the radar device 11. The analysis unit 102 identifies the intersection of the three circles as the coordinates of the forklift 10 on which it is provided (step S109). Thus, the absolute position of the forklift 10 is analyzed on the basis of the absolute positions of the plurality of reflective plates R, in addition to each of positional relationships between the plurality of reflective plates R and the forklift 10. The display unit 104 outputs the position of the forklift 10 computed by the analysis unit 102 onto a spatial map displayed on a monitor provided on the spatial recognition device 1 (step S110).

As a result thereof, the user is able to see positional information within the space in which the forklift 10 is moving. Additionally, based on the position of the forklift 10, the display unit 104 may acquire, from the HDD 106, information such as the freight IDs, the types of freight and the amount of freight, such as containers, placed near that position, and may output this information so as to be overlaid on the spatial map displayed on the monitor.

The control unit 101 determines whether or not the processing is to be ended (step S111). If the processing is not to be ended (NO in step S111), the control unit 101 implements control to repeat the process from step S101. On the other hand, if the processing is to be ended (YES in step S111), the control unit 101 ends the processing flow shown in FIG. 4.

By means of the above-described process, the spatial recognition device 1 provided on the forklift 10 is able to easily recognize, in a space in which many stationary structures are arranged in the same pattern and various objects are placed, the current position of the forklift 10 and objects placed near that position. Additionally, the spatial recognition device 1 does not need to be provided with a device for identifying its own position by analyzing signals emitted from position information emitting tags, or with a device for identifying its own position by analyzing the position by means of a GNSS (Global Navigation Satellite System) or the like. That is, the spatial recognition device 1 only requires reflective plates R to be provided on stationary structures. For this reason, it is possible to reduce the cost of the devices constituting the system. Additionally, the spatial recognition device 1 uses light to measure the position of the moving body on which that device is mounted, and does not use radio waves, which may affect electronic circuits. For this reason, the invention is useful for a device to recognize its own position in areas in which the emission of radio signals is restricted.

In the above-described process, the analysis unit 102 determines whether or not areas correspond to reflective plates R based on a range where the reflected light intensity in that area is a threshold value or higher. However, the analysis unit 102 may further determine the areas corresponding to reflective plates R based on the difference in the reflected light intensity between pixel areas in which the reflected light intensity is the threshold value or higher, and pixels that are adjacent to those pixel areas and that have reflected light intensities lower than the threshold value. In other words, the analysis unit 102 may identify pixel areas in which the reflected light intensity is the threshold value or higher as being areas corresponding to reflective plates R to be analyzed only when the difference is a prescribed threshold value or higher.

Figure 7:
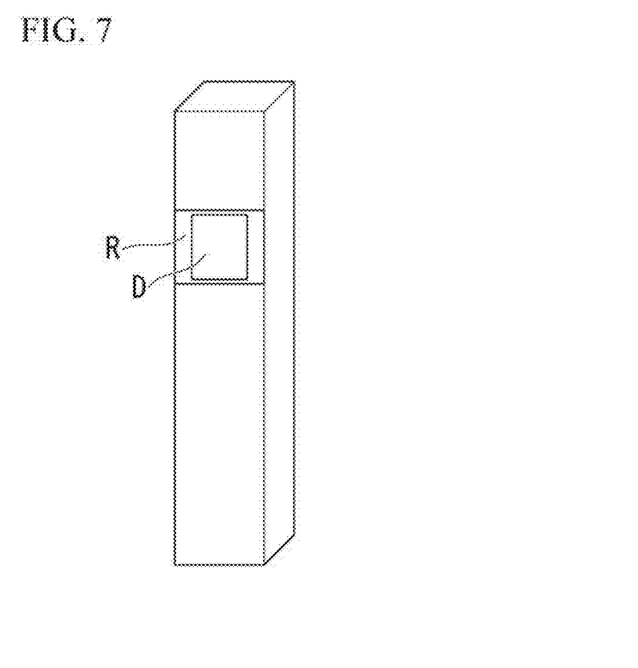
FIG. 7 is a diagram illustrating a first modified example of a reflective plate according to an embodiment of the present invention.

FIG. 7 is a diagram illustrating a first modified example of a reflective plate R.

The reflective plate R may have two-dimensional code information D, such as a QR code (registered trademark), printed thereon. In this case, the analysis unit 102 acquires a binary image in which, within a high-intensity area A2 that has been determined as being an area corresponding to a reflective plate R, pixels are assigned two values associated with pixels for which the reflected light intensity is less than the threshold value and pixels for which the reflected light intensity is the threshold value or higher. In this case, for example, the threshold value used for acquiring the binary image is greater than the threshold value when determining the high-intensity areas A2. Alternatively, the analysis unit 102 may determine that regions surrounded by pixels in which the reflected light intensity is a threshold value or higher as high-intensity areas A2. The analysis unit 102 determines that the binary image constitutes two-dimensional code information D. Based on the binary image within the high-intensity area A2, the analysis unit 102 may read information such as the coordinates and column numbers of the reflective plates R by means of conventional methods for analyzing two-dimensional code information D. Thus, the analysis unit 102 may analyze identification information for the stationary structures based on the distributions in reflective regions (two-dimensional code information D) provided in reflective plates R acquired on the basis of reflected light intensities at coordinates within the areas corresponding to the reflective plates R.

Figure 8:
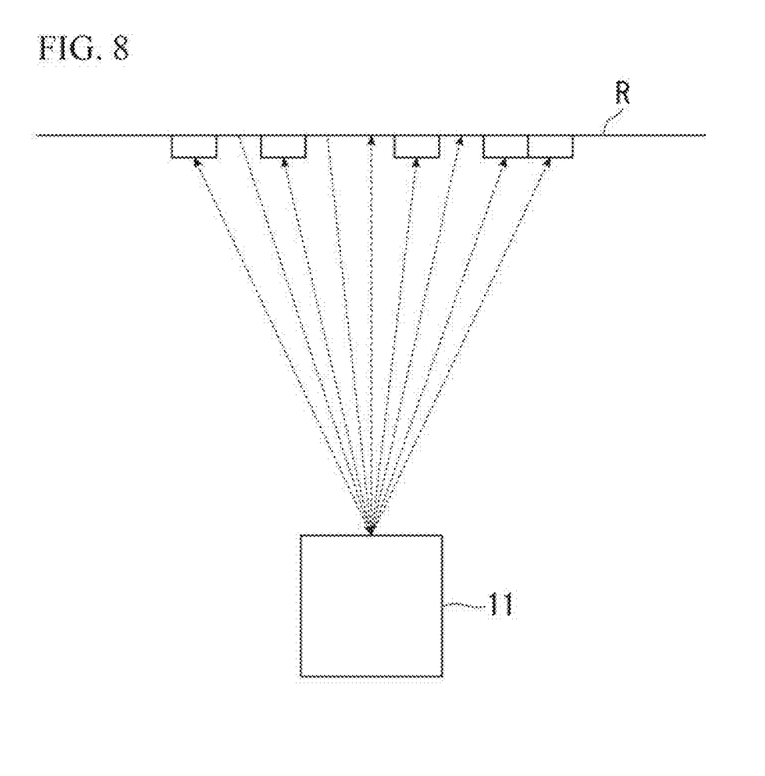
FIG. 8 is a diagram illustrating a second modified example of a reflective plate according to an embodiment of the present invention.

FIG. 8 is a diagram illustrating a second modified example of a reflective plate R.

The reflective plate R may be provided with recesses and protrusions as shown in FIG. 8. In this case, the analysis unit 102 computes the range to the reflection position corresponding to each of the pixels in the high-intensity area A2 determined to be the area of a reflective plate R. The analysis unit 102, for example, computes the range from the radar device 11 to the reflection position corresponding to each of the pixels in the high-intensity area A2 on the basis of the time elapsed from the light radiation time to the light reception time. Based on the computed ranges, the analysis unit 102 detects pixels in which the difference in the range relative to adjacent pixels is large and pixels in which the difference in the range relative to adjacent pixels is small. The analysis unit 102 acquires a binary image obtained by binarizing each pixel based on whether determining the range between adjacent pixels is large or small, and determines that the binary image constitutes two-dimensional code information D. Based on the binary image within the high-intensity area A2, the analysis unit 102 may read information such as the coordinates and column numbers of the reflective plates R by means of conventional methods for analyzing two-dimensional code information D.

In this way, the distribution of reflected light information may be a distribution of the range from the radiation point to the reflection point in real space corresponding to each coordinate, based on the time elapsed from the light radiation time to the reflected light reception time. The analysis unit 102 determines the positional relationship based on the distribution of the ranges. Additionally, the analysis unit 102 may further analyze stationary structure identification information based on the distribution of recesses and protrusions provided on reflective plates R acquired on the basis of the range distribution.

Figure 9:
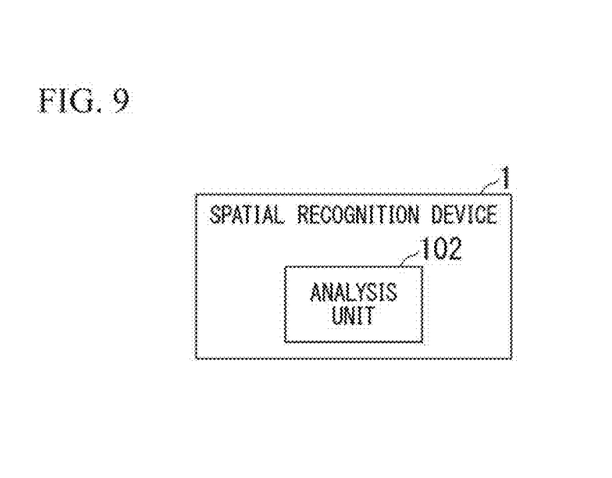
FIG. 9 is a diagram illustrating the minimum structure of a spatial recognition device according to an embodiment of the present invention.

FIG. 9 is a diagram illustrating the minimum structure of the spatial recognition device 1.

The spatial recognition device 1 illustrated in FIG. 9 only needs to be provided with at least an analysis unit 102.

A moving body is provided with an optical device. The optical device receives reflected light obtained by radiating light onto reflective plates provided on stationary structures positioned in a detection area. The analysis unit 102 determines at least the positional relationship between the moving body and stationary structures on which reflective plates are provided, based on the distribution of reflected light information obtained based on the reflected light in accordance with the light radiation direction.

The above-mentioned spatial recognition device has a computer system in the interior thereof. Furthermore, the steps in the above-described processes are stored on a computer-readable recording medium in the form of a program, and the above-described processes are performed by the computer reading and executing this program. In this case, computer-readable recording media refer to magnetic disks, magneto-optic disks, CD-ROMs, DVD-ROMs, semiconductor memory devices and the like. Additionally, this computer program may be distributed to a computer by means of communication lines, and the program may be executed by the computer receiving the distributed program.

Additionally, the above-mentioned program may be for realizing some of the aforementioned functions.

Furthermore, the aforementioned functions may be implemented by a so-called difference file (difference program) that can be realized by being combined with a program that is already recorded on a computer system.

Priority is claimed on Japanese Patent Application No. 2017-170376, filed Sep. 5, 2017, the entire disclosure of which is incorporated herein by reference.

INDUSTRIAL APPLICABILITY

According to the present invention, in a space in which many stationary structures are arranged in the same pattern and various objects are placed, the spatial recognition device can easily recognize the current position of a moving body or an object placed near that position.

REFERENCE SIGNS LIST

1 Spatial recognition device
10 Forklift
11 Radar device
12 Terrestrial communication antenna
13 Satellite antenna
101 Control unit
102 Analysis unit
103 Vehicle information acquisition unit
104 Display unit
105 Recording unit

The invention claimed is:

1. A spatial recognition device comprising:
at least one memory configured to store a program; and
at least one processor configured to execute the program to:
acquire, from an optical device, which is mounted on a moving body and which receives reflected light obtained by radiating light onto a reflective plate provided on a stationary structure positioned within a detection area, reflected light information obtained based on the reflected light in accordance with a radiation direction of the light; and
determine a positional relationship between the moving body and the stationary structure on which the reflective plate is provided, based on a distribution of the reflected light information at coordinates within the detection area,
wherein the distribution of the reflected light information obtained based on the reflected light is a distribution in an area in which an intensity of the reflected light exceeds an intensity threshold value, and
wherein the at least one processor is configured to execute the program to determine the positional relationship between the moving body and the stationary structure on which the reflective plate to be analyzed is provided, based on the distribution of a high-intensity area corresponding to pixels in which the intensity of the reflected light exceeds the intensity threshold value among pixels obtained by dividing an image surface of the detection area vertically and horizontally, and a number of pixels included in the high-intensity area.

2. The spatial recognition device according to claim 1, wherein:
the distribution of the reflected light information is a distribution, within the detection area, in a reflective area in which the intensity of the reflected light included in the reflected light information exceeds the intensity threshold value; and
the at least one processor is configured to execute the program to determine the positional relationship based on the distribution in the reflective area.

3. The spatial recognition device according to claim 2, wherein the at least one processor is configured to execute the program to:
analyze identification information of the stationary structure based on a distribution in a reflective region provided on the reflective plate acquired based on the intensities of the reflected light at the coordinates in the reflective area.

4. The spatial recognition device according to claim 2, wherein the at least one processor is configured to execute the program to:
analyze an absolute position of the moving body based on an absolute position of the stationary structure in addition to the positional relationship.

5. The spatial recognition device according to claim 1, wherein:
the distribution of the reflected light information is a distribution of ranges from a radiation point to reflection points, in real space, corresponding to the coordinates, based on time elapsed from radiation times of the light to reception times of the reflected light; and the at least one processor is configured to execute the program to determine the positional relationship based on the distribution of the ranges.

6. The spatial recognition device according to claim 5, wherein the at least one processor is configured to execute the program to:

analyze identification information of the stationary structure based on a distribution of recesses and protrusions provided on the reflective plate acquired based on the distribution of the ranges.

7. A spatial recognition method comprising:

acquiring, from an optical device, which is mounted on a moving body and which receives reflected light obtained by radiating light onto a reflective plate provided on a stationary structure positioned within a detection area, reflected light information obtained based on the reflected light in accordance with a radiation direction of the light; and determining a positional relationship between the moving body and the stationary structure on which the reflective plate is provided, based on a distribution of the reflected light information at coordinates within the detection area, wherein the distribution of the reflected light information obtained based on the reflected light is a distribution in an area in which an intensity of the reflected light exceeds an intensity threshold value, and wherein, in the determining the positional relationship between the moving body and the stationary structure on which the reflective plate to be analyzed is provided is determined, based on the distribution of a high-intensity area corresponding to pixels in which the intensity of the reflected light exceeds the intensity threshold value among pixels obtained by dividing an image surface of the detection area vertically and horizontally, and a number of pixels included in the high-intensity area.

8. A non-transitory computer-readable recording medium storing a program that, if executed, causes a computer in a spatial recognition device to execute processes, the processes comprising:

acquiring, from an optical device, which is mounted on a moving body and which receives reflected light obtained by radiating light onto a reflective plate provided on a stationary structure positioned within a detection area, reflected light information obtained based on the reflected light in accordance with a radiation direction of the light; and determining a positional relationship between the moving body and the stationary structure on which the reflective plate is provided, based on a distribution of the reflected light information at coordinates within the detection area, wherein the distribution of the reflected light information obtained based on the reflected light is a distribution in an area in which an intensity of the reflected light exceeds an intensity threshold value, and wherein in the determining the positional relationship between the moving body and the stationary structure on which the reflective plate to be analyzed is provided is determined, based on the distribution of a high-intensity area corresponding to pixels in which the intensity of the reflected light exceeds the intensity threshold value among pixels obtained by dividing an image surface of the detection area vertically and horizontally, and a number of pixels included in the high-intensity area.

* * * * *